(12) United States Patent
Reven et al.

(10) Patent No.: US 11,960,064 B2
(45) Date of Patent: Apr. 16, 2024

(54) MWIR LENS SYSTEM FOR WIDE AREA MOTION IMAGERY

(71) Applicant: BAE SYSTEMS Information and Electronic Systems Integration Inc., Nashua, NH (US)

(72) Inventors: Shawn C. Reven, Greenlawn, NY (US); Daniel Engheben, Commack, NY (US); Jacinto E. Malabuyoc, Holbrook, NY (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 299 days.

(21) Appl. No.: 17/408,537

(22) Filed: Aug. 23, 2021

(65) Prior Publication Data

US 2023/0066240 A1 Mar. 2, 2023

(51) Int. Cl.
*G02B 13/14* (2006.01)
*G02B 15/02* (2006.01)
(Continued)

(52) U.S. Cl.
CPC .............. *G02B 13/14* (2013.01); *G02B 15/02* (2013.01); *G02B 26/0816* (2013.01); *G02B 26/10* (2013.01)

(58) Field of Classification Search
CPC ....... G02B 13/14; G02B 13/146; G02B 23/12
See application file for complete search history.

(56) References Cited

U.S. PATENT DOCUMENTS 5,373,151 A * 12/1994 Eckel, Jr. .............. F41G 7/2253
348/E5.081
5,400,161 A * 3/1995 Lambert, Jr. ........ H04N 25/674
349/1
(Continued)

FOREIGN PATENT DOCUMENTS

CN 102509416 A 6/2012
CN 107505690 A 12/2017
(Continued)

OTHER PUBLICATIONS

British Search Report, GB2205724.4, dated Oct. 19, 2022, 6 pages.
(Continued)

*Primary Examiner* — Christopher Stanford
(74) *Attorney, Agent, or Firm* — Maine Cernota & Curran; Scott J. Asmus

(57) ABSTRACT

A Mid-Wave Infrared (MWIR) objective and relay lens system has an F# of 3.33 and angular field of view of 15.28°. It is deployed, with a focal plane and scanning system, on airborne platforms for wide area motion imagery. It is corrected for monochromatic and chromatic aberrations over of 3.3 to 5.1 micrometers. Effective focal length is 20 inches, and the overall length is 40.70 inches. The lens has, from object to image, two groups of optical elements with a cold shield/aperture stop 6 inches from the image plane. Group 1 acts as an objective lens with a positive power and three elements, Group 2 acts as a relay lens has a positive power and four elements. The lens is made of Germanium and Silicon. It used in a scanning system in a pre-objective configuration where the fast scan mirror is located in front of the lens system.

19 Claims, 18 Drawing Sheets

(51) Int. Cl.
    *G02B 26/08*    (2006.01)
    *G02B 26/10*    (2006.01)

(56) References Cited

U.S. PATENT DOCUMENTS

| | | |
|---|---|---|
| 8,101,918 B1 | 1/2012 | Mercado |
| 8,867,140 B2 | 10/2014 | Oskotsky |
| 9,091,840 B1 | 7/2015 | Vizgaitis |
| 9,297,987 B2 | 3/2016 | Oskotsky |
| 2012/0162750 A1 | 6/2012 | Vizgaitis |
| 2013/0076900 A1 | 3/2013 | Mrozek et al. |
| 2020/0142160 A1 | 5/2020 | Oskotsky |

FOREIGN PATENT DOCUMENTS

| | | |
|---|---|---|
| CN | 109324392 A | 2/2019 |
| WO | 2018236344 A1 | 12/2018 |

OTHER PUBLICATIONS

Office Action for U.S. Appl. No. 17/238,477 dated Jun. 6, 2023, 22 pages.
Notice of Allowance for U.S. Appl. No. 17/238,477 dated Nov. 7, 2023, 17 pages.

\* cited by examiner

MRTD TARGET

200

300

400

THERMAL POWERS FOR COMMON IR MATERIALS

600

INFRARED MATERIALS DISPERSION CHART

MWIR LENS

MWIR LENS PERSPECTIVE 3D VIEW

1000

1400A

|  | RDY | THI | RMD | GLA | CCY | THC | GLC |
|---|---|---|---|---|---|---|---|
| OBJ: | INFINITY | INFINITY |  | AIR | 100 | 100 |  |
| 1: | INFINITY | 31.496063 |  | AIR | 100 | 100 |  |
| 2: | INFINITY | -6.889764 | REFL | AIR | 100 | 100 |  |

SLB: "FSM"
XDE:    0.000000    YDE:    0.000000    ZDE:    0.000000    BEN
XDC:         100    YDC:         100    ZDC:         100
ADE:  -45.000000    BDE:    0.000000    CDE:    0.000000
ADC:         100    BDC:         100    CDC:         100

| 3: | INFINITY | -0.000000 |  |  | 100 | 100 |  |

SLB: "Reference"

| 4: | -10.20901 | -0.984252 |  | SILICON_SPECIAL | 100 | 100 |  |

SLB: "Element 1"
ASP:
K   :   -2.265833    KC :         100
CUF:    0.000000    CCF:         100
A  :-.656599E-04    B  :0.263473E-05    C  :-.296207E-08    D  :-.872988E-10
AC :         100    BC :         100    CC :         100    DC :         100
ITR: FST

| 5: | -44.23198 | -1.002346 |  | AIR | 100 | 100 |  |

ASP:
K   :    0.000000    KC :         100
CUF:    0.000000    CCF:         100
A  :0.000000E+00    B  :0.000000E+00    C  :0.000000E+00    D  :0.000000E+00
AC :         100    BC :         100    CC :         100    DC :         100

| 6: | -58.89313 | -0.551181 |  | GERMMW_SPECIAL | 100 | 100 |  |

SLB: "Element 2"
ASP:
K   :  -92.070566    KC :         100
CUF:    0.000000    CCF:         100
A  :-.462524E-03    B  :0.371682E-05    C  :-.777795E-07    D  :0.930649E-09
AC :         100    BC :         100    CC :         100    DC :         100
ITR: FST

| 7: | -9.05168 | -3.978904 |  | AIR | 100 | 100 |  |

ASP:
K   :    0.000000    KC :         100
CUF:    0.000000    CCF:         100
A  :0.000000E+00    B  :0.000000E+00    C  :0.000000E+00    D  :0.000000E+00
AC :         100    BC :         100    CC :         100    DC :         100

```
 8:        -39.73968       -0.787402      GERMMW_SPECIAL     100    100
    SLB: "Element 3"
    ASP:
    K   :   0.000000    KC :      100
    CUF:   0.000000    CCF:      100
    A  :0.000000E+00   B :0.000000E+00   C :0.000000E+00   D :0.000000E+00
    AC :      100      BC :      100     CC :      100     DC :      100

9:        126.25564       -4.724409      AIR                100    100
    ASP:
    K   :   0.000000    KC :      100
    CUF:   0.000000    CCF:      100
    A  :0.000000E+00   B :0.000000E+00   C :0.000000E+00   D :0.000000E+00
    AC :      100      BC :      100     CC :      100     DC :      100

10:        INFINITY         6.299213   REFL AIR              100    100
    SLB: "IR FOLD 1"
    XDE:   0.000000   YDE:   0.000000   ZDE:   0.000000   BEN
    XDC:      100     YDC:      100     ZDC:      100
    ADE:  45.000000   BDE:   0.000000   CDE:   0.000000
    ADC:      100     BDC:      100     CDC:      100

11:        INFINITY         6.299213      AIR                100    100
    SLB: "Calibration"
12:        INFINITY        -3.779528   REFL AIR              100    100
    SLB: "IR FOLD 2"
    XDE:   0.000000   YDE:   0.000000   ZDE:   0.000000   BEN
    XDC:      100     YDC:      100     ZDC:      100
    ADE:  45.000000   BDE:   0.000000   CDE:   0.000000
    ADC:      100     BDC:      100     CDC:      100

13:        -19.57203       -0.787402      SILICON_SPECIAL    100    100
    SLB: "Element 4"
    ASP:
    K   :  -8.210351    KC :      100
    CUF:   0.000000    CCF:      100
    A  :0.182033E-04   B :0.107944E-05   C :-.193774E-07   D :0.350634E-09
    AC :      100      BC :      100     CC :      100     DC :      100
    ITR: FST 14:         61.40640       -0.183018      AIR                100    100
    ASP:
    K   :   0.000000    KC :      100
    CUF:   0.000000    CCF:      100
    A  :0.000000E+00   B :0.000000E+00   C :0.000000E+00   D :0.000000E+00
    AC :      100      BC :      100     CC :      100     DC :      100
```

```
15:         -3.63682         -0.787402         SILICON_SPECIAL    100    100
   SLB: "Element 5"
   ASP:
   K  :     0.000000    KC :       100
   CUF:     0.000000    CCF:       100
   A  :0.000000E+00    B  :0.000000E+00    C  :0.000000E+00    D  :0.000000E+00
   AC :        100     BC :       100      CC :       100      DC :       100

16:         -4.39844         -0.329645         AIR                100    100
   ASP:
   K  :     0.000000    KC :       100
   CUF:     0.000000    CCF:       100
   A  :0.000000E+00    B  :0.000000E+00    C  :0.000000E+00    D  :0.000000E+00
   AC :        100     BC :       100      CC :       100      DC :       100

17:         -4.18099         -0.433071         GERMMW_SPECIAL     100    100
   SLB: "Element 6"
   ASP:
   K  :     0.000000    KC :       100
   CUF:     0.000000    CCF:       100
   A  :0.000000E+00    B  :0.000000E+00    C  :0.000000E+00    D  :0.000000E+00
   AC :        100     BC :       100      CC :       100      DC :       100

18:         -2.54007         -2.346632         AIR                100    100
   ASP:
   K  :     0.000000    KC :       100
   CUF:     0.000000    CCF:       100
   A  :0.000000E+00    B  :0.000000E+00    C  :0.000000E+00    D  :0.000000E+00
   AC :        100     BC :       100      CC :       100      DC :       100

19:         -9.08177         -0.472441         GERMMW_SPECIAL     100    100
   SLB: "Element 7"
   ASP:
   K  :     0.000000    KC :       100
   CUF:     0.000000    CCF:       100
   A  :0.000000E+00    B  :0.000000E+00    C  :0.000000E+00    D  :0.000000E+00
   AC :        100     BC :       100      CC :       100      DC :       100

20:         -13.69442        -0.762753         AIR                100    100
   ASP:
   K  :    -72.644570   KC :       100
   CUF:     0.000000    CCF:       100
   A  :-.241066E-02    B  :0.601195E-03    C  :-.100261E-03    D  :0.111805E-04
   AC :        100     BC :       100      CC :       100      DC :       100
   ITR: FST
```

```
21:            INFINITY        -0.098425     GERMMW_SPECIAL    100    100
    SLB: "Dewar Window"
22:            INFINITY        -0.098425     AIR               100    100
STO:           INFINITY        -0.000000     AIR               100    100
    SLB: "STOP"
24:            INFINITY        -0.118110     GERMMW_SPECIAL    100    100
    SLB: "Cold Filter"
25:            INFINITY        -5.881890     AIR               100    100
26:            INFINITY         0.000000     AIR               100    100
IMG:           INFINITY        -0.000000     AIR               100    100
    SLB: "FPA"
```

SPECIFICATION DATA
```
  EPD       6.00626
  DIM       IN
  WL        5100.00    4900.00    4700.00    4500.00    4300.00    4100.00    3900.00
            3700.00    3500.00    3300.00
  REF       6
```

REFRACTIVE INDICES
```
  GLASS CODE          5100.00    4900.00    4700.00    4500.00    4300.00    4100.00    3900.00
                      3700.00    3500.00    3300.00
  GERMMW_SPECIAL      4.014756   4.016060   4.017538   4.019220   4.021147   4.023369   4.025950
                      4.028974   4.032548   4.036818
  SILICON_SPECIA      3.422060   3.422499   3.422997   3.423568   3.424224   3.424982   3.425864
                      3.426897   3.428117   3.429572
```

```
        INFINITE  CONJUGATES
            EFL        20.0000
            BFL        -0.0010
            FFL       -36.4560
            FNO        -3.3299
            IMG DIS     0.0000
            OAL         9.0975
        PARAXIAL  IMAGE
            HT          1.9161
            ANG         5.4727
        ENTRANCE  PUPIL
            DIA         6.0063
            THI        31.2002
        EXIT  PUPIL
            DIA         1.7755
            THI         5.9112
```

The form of asphere surfaces is as follows:

$$z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

where:

| | |
|---|---|
| z | is the sag of the surface parallel to the z-axis |
| c | is the curvature at the pole of the surface (CUY) |
| k | is the conic constant (K) and |

| | | |
|---|---|---|
| $k = 0$ | – | sphere |
| $-1 < k < 0$ | – | ellipsoid with major axis on the optical axis (prolate spheroid) |
| $k = -1$ | – | paraboloid |
| $k < -1$ | – | hyperboloid |

Also, $k = -e^2$, where e is eccentricity

| | | |
|---|---|---|
| For $k > 0$ | – | oblate spheroid (not a conic section) the surface is generated by rotating an ellipse about its minor axis and |

$$k = e^2/(1 - e^2)$$

where e is the eccentricity of the generating ellipse

A, B, C, D, E, F, G, H, J   are the 4th, 6th, 8th, 10th, 12th, 14th, 16th, 18th, 20th order deformation coefficients, respectively (A = B = C = D = E = F = G = H = J = 0 yields a pure conic surface)

r    is the radial distance = $\sqrt{x^2+y^2}$

MWIR LENS SYSTEM FOR WIDE AREA MOTION IMAGERY

STATEMENT OF GOVERNMENT INTEREST

The present disclosure was developed under Subcontract No. S19CNE185 awarded by a Classified Agency, and Prime Contract Nos. FA8002-18-C-0279 and FA8002-20-C-0361, and the United States Government has certain rights thereto.

FIELD

The present disclosure relates, in general, to an infrared lens system used in an airborne wide area motion imagery system, producing an image in the MWIR with a spectral wavelength range of 3.3 micrometers to 5.1 micrometers.

BACKGROUND

The infrared lens objective is one of the most important subsystems of the remote sensing system. Its function is to collect the maximum amount of radiated energy from the target scene and project the image of the scene onto the system focal plane. It also establishes the critical sensor system performance parameters of target resolution, field of view, image quality and image rectilinearity.

In general, Infrared (IR) optical system design has a number of considerations and tradeoffs that make the process and configuration more complex. These include image spot size versus focal plane pixel size and pitch, transmittance and thermal performance of infrared lens objective materials, vignetting by lens elements and, most importantly, cold shield efficiency.

These considerations are in addition to the overall goals of maximizing system resolving-power, maintaining good area coverage, maximizing light collection, and minimizing system size, cost, and weight.

MWIR lenses are widely used in airborne imaging sensors designed for high resolution and wide wavelength range imaging applications such as reconnaissance, surveillance, and mapping. For these applications, the lens must meet strict optical requirements over the wavelength range of about 3.3 micrometers to about 5.1 micrometers. MWIR lenses typically utilize a number of materials to provide the necessary optical performance. The application of a high performance MWIR lens allows for a sensor system with reduced Size, Weight, Power and Complexity (SWaP-C). The lens objective must also provide high transmittance, high resolution, low distortion, and a flat image over large field of view.

For IR imaging systems, which detect the thermal radiation from objects, an important measure of performance is the ability to detect small changes in temperature, called thermal resolution. The smallest temperature difference a system can distinguish from the background noise (and therefore can display) is called the thermal resolution. Temperature changes smaller than the thermal resolution will not be detected. Often thermal resolution is described by NETD, which stands for Noise-Equivalent-Temperature-Difference. NETD is the temperature difference in which the signal power detected is equal to the noise-equivalent-power (NEP).

The thermal resolution (or NETD) can be improved by increasing the size of the detecting elements, since more flux will be collected by each element. Unfortunately, this degrades the spatial resolution, by increasing the Instantaneous Field Of View (IFOV). As a general result (which is not proven here) the thermal and spatial resolution are inversely proportional.

Since it is not possible to simultaneously achieve high spatial and thermal resolution, neither is a good measure of the overall IR imaging system performance. A single quantity, called the Minimum Resolvable Temperature Difference (MRTD), measures both performance factors simultaneously. MRTD is determined experimentally and therefore takes into account all of the various contributing factors. Measurement of MRTD is done by slowly heating a test pattern at some range from the detector.

FIG. 1 (Prior Art) depicts a typical test pattern 100. The spacing from one bar to another is a single cycle of the test pattern. For a spacing of d millimeters, the spatial frequency is 1/d with units of cycles/millimeter. Since the spatial extent is related to the IFOV by the range, the spatial frequency can be expressed as cycles/milliradian calculated from 1000/(R d).

MRTD is the temperature difference at which bars of a particular frequency first become visible against the background. MRTD has units of degrees C. at a given spatial frequency (in cycles/milliradian). MRTD combines both spatial and thermal resolution into a single quantity that can be used to compare systems.

MWIR lenses designed for high resolution and wide wavelength range imaging applications such as reconnaissance, surveillance and mapping are often deployed in airborne platforms. For a broad applicability of airborne platforms, the lens must be able to perform over a wide environmental temperature range. To meet the critical sensor system performance parameters of target resolution and image quality, the lens must specifically be able to maintain focus over the specified environmental temperature range. Focus changes with temperature can be quite large, reducing the tolerable environmental temperature range of an optical system.

For example, considering the simple case of a single element thin lens, the change in focal length of the lens with temperature is given by:

$$\Delta f = -\gamma f \Delta T = -\left(\frac{dn/dT}{n-1} - \alpha_L\right) f \Delta T$$

Where:
γ=thermo-optical coefficient of the lens
dn/dT=refractive index change with temperature
n=refractive index of the lens
$\alpha_L$=Thermal Expansion Coefficient (TCE) of the lens
f=focal length of the lens
ΔT=temperature change Further considering the simple case of this lens housing, the expansion of the housing with temperature is given by:

$$\Delta L = \alpha_H L \Delta T$$

Where
$\alpha_H$=Thermal Coefficient of Expansion (TCE) of the housing
L=length of the housing In the case of most IR materials, r is positive and indicates a negative change in focal length with increasing temperature, while the housing expands, giving the total amount of defocus as:

$$\Delta z = \Delta L - \Delta f$$

From aberration theory, the depth of focus for a diffraction limited imaging system ($\lambda/4$) is given by:

$$\Delta z = \pm 2\lambda (F/\#)^2$$

Where
F/#=f/D (focal length/clear aperture diameter)
Combining the above gives the tolerable temperature change for a single element thin lens:

$$\Delta T = \pm \frac{2\lambda (F/\#)}{D(\alpha_H + \gamma)}$$

FIG. 2 (Prior Art) depicts, as an example, the tolerable temperature change 200 for an MWIR objective made of a single Germanium lens. As illustrated in FIG. 2, the amount of tolerable temperature change decreases with increasing lens size/decreasing f/#.

As it is often not possible to hold the IR system within tolerable temperature limits, some method that compensates for the change in focus with temperature must be employed. This is known as athermalization and the choice of technique ultimately depends on the application for which the IR system is to be used. The techniques for athermalization fall into three main categories:
1. Electro-mechanically active
2. Mechanically passive
3. Optically passive Each option must be appropriately weighed with respect to the cost, performance, etc. for the system under consideration. Many systems incorporating these techniques have been designed, built, and tested.

Electro-mechanical active athermalization relies on lens elements being moved in a controlled manner by electro-mechanical devices using information from separate temperature sensors or image quality metrics. This requires a complex servo-mechanism design and is most suitable in optical systems such as zoom lenses in which an electro-mechanical focus mechanism already exists. The main advantages of this method are they can cope with thermal gradients through the system, easily cope with non-linear effects, and there is no thermal inertia (temperature sensors can be placed at the compensator elements). Disadvantages of this technique of athermalization are decreased reliability, increased size, weight, power, complexity and cost (SWAP-C^2).

Mechanical passive athermalization essentially involves some method of moving a lens element or elements through the thermal expansion of the lens structure material by an amount that compensates for thermal defocus. A large number of materials can be utilized as spacers or structural elements, with a correspondingly wide range of expansion coefficients. Some choices in MWIR structure materials are given in the Coefficients of Thermal Expansion (CTE) for most common Opto-mechanical materials in Table 1 below:

TABLE 1

| Material | CTE (x 10-6K-1) |
|---|---|
| Aluminum | 23.6 |
| Invar | 0.5 to 2.0 |
| 1025 Steel | 12.0 |
| AlBeMet | 13 |

By using two different materials with very different thermal expansions arranged as either differential expansion cylinders or rods, it is possible to move the compensating element directly. The rods or cylinders must be of sufficient length to give the required differential movement.

Consider combining spacers of length $L_1$ and $L_2$ of materials with thermal coefficients of expansion $\alpha_1$ and $\alpha_2$ respectively, then to athermalize over a distance L requires that:

$$\alpha_1 L_1 + \alpha_2 L_2 = 0$$

Using materials with $\alpha > 0$ requires $L<0$, that is:

$$\alpha_1 L_1 - \alpha_2 L_2 = 0$$

$$L_1 - L_2 = L$$

To achieve passive mechanical athermalization housing materials and lengths are carefully chosen to compensate for thermal focus shift.

Optically passive athermalization eliminates the thermally induced defocus in the system by combining suitably chosen lens materials that together compensate for thermal focus shift. Typical MWIR lens materials properties are shown in Table 2 below.

TABLE 2

| Material | Refractive Index @ 4 | Refractive Index @ 10 μ | CTE (ppm/K) | dn/dT (ppm/K) | Knoop Hardness (g/mm2) | Spectral Range |
|---|---|---|---|---|---|---|
| Germanium | 4.0243 | 4.0032 | 6 | 396 | 800 | 2.0-17.0 μm |
| Silicon | 3.4255 | N/A | 2.7 | 150 | 1150 | 1.2-9.0 μm |
| ZnS (Cleartran) | 2.2523 | 2.2008 | 4.6 | 54 | 230 | 0.37-14.0 μm |
| ZnSe | 2.4331 | 2.4065 | 7.1 | 60 | 105 | 0.55-20.0 μm |
| Magnesium Fluoride | 1.3526 | N/A | 8 | 20 | 415 | 0.11-7.5 μm |
| Sapphire | 1.6753 | N/A | 5.6 | 13.7 | 1370 | 0.17-5.5 μm |
| Gallium Arsenide | 3.3069 | 3.2778 | 5.7 | 148 | 721 | 0.9-16.0 μm |
| $CaF_2$ | 1.4097 | 1.3002 | 18.9 | −11 | 170 | 0.13-10.0 μm |
| $BaF_2$ | 1.458 | 1.4014 | 18.4 | −15 | 82 | 0.15-12.5 μm |

If the lens undergoes a change in temperature, its material properties can vary greatly, causing a significant change in its optical property of index of refraction with respect to temperature, referred to as dn/dt. The dn/dt changes the optical power and focusing ability of the lens. The dn/dt values for the Silicon and Germanium are given in FIGS. 3 and 4.

FIG. 3 (Prior Art) depicts the silicon refractive index change 300 with temperature. As depicted, the index of refraction increases with temperature.

FIG. 4 (Prior Art) depicts the Germanium refractive index change 400 through temperature and spectrum for 50, 100, 150, 200, 250, and 300 degrees Kelvin.

When a lens undergoes a change in temperature, its physical dimensions can also change. The characterization of this amount of dimensional change with thermal change is referred to as the material's Coefficient of Thermal Expansion (CTE). The CTE effects also cause a change in the optical power and focusing ability of the lens. CTE and dn/dt of the materials in a lens are the leading causes of focus shifts in MWIR imaging systems. In most cases, these effects can be mitigated through the athermalization techniques noted previously.

The combined effects of dn/dt and CTE can be characterized by the thermal power of the lens. The thermal power of the lens is given by:

Thermal Power:

$$\gamma = \frac{1}{(n_{ref}-1)} \frac{\delta n}{\delta T} - \alpha$$

∂n/∂T is the change of index with respect to temperature, $n_{ref}$ is the index of refraction at the reference temperature, and a is the linear coefficient of thermal expansion.

FIG. 5 (Prior Art) is a chart 500 showing thermal powers for some common IR materials. As can be seen, thermal powers of lens materials can be negative or positive, so suitable combinations of materials and powers can be arranged so that a lens is passively optically athermalized.

In order for the MWIR objective lens to have good overall imaging performance, besides maintaining focus over its environmental temperature range, it must also maintain focus across its operating wavelength range as well. When a lens maintains good focus over its wavelength range it is considered achromatized. When not achromatized, the lens focus point for each wavelength is different along the optical axis. When achromatized, the shortest and longest wavelengths in the objective lens wavelength range come to a common focus and the lens is considered corrected for primary axial chromatic aberration. Glass types and lens optical powers are carefully selected to achieve primary axial color correction.

To achieve secondary color correction, the center wavelength of the MWIR objective lens wavelength range must also be designed to focus at the same point as the shortest and longest wavelengths. When this is achieved, the lens is considered corrected for secondary axial color. Secondary color correction is important, as it is often limits the imaging performance of high resolution lenses.

The contribution of individual optical elements to the total objective lens axial chromatic aberration is proportional to the square of axial marginal ray height at the element, its optical power and it is reciprocal of Abbe number of lens material.

The Abbe number $V_{\lambda 2}$ though the definite width of the spectrum is given by:

$$V_{\lambda 2}=(n_{\lambda 2}-1)/(n_{\lambda 1}-n_{\lambda 3}) \quad (1)$$

where $n_{\lambda 2}$ is the index of refraction of the glass at the center wavelength λ2 of the required spectrum, $n_{\lambda 1}$ is the index of refraction at shortest wavelength λ1 of the spectrum and $n_{\lambda 3}$ is the index of refraction at the longest wavelength λ3 of the spectrum.

The smaller the value of $V_{\lambda 2}$, the greater the chromatic dispersion of the glass.

Germanium has a V-value of approximately 100 in the MWIR spectrum, and elements from germanium act as flint glass and have negative optical powers. Silicon V-value is 250, and elements from silicon act as crown glass and have positive optical powers. Axial color correction is accomplished by matching different dispersions to the different optical powers. The lack of materials available in the MWIR wavelength range makes this task difficult, along with the generally inability to fabricate cemented achromatic doublets in the infrared.

FIG. 6 (Prior Art) is an infrared materials dispersion chart 600 showing the dispersion characteristics of various infrared materials across a broad frequency wavelength range of 1 to 12 microns.

Relevant applications and patents include patent CN107505690A that discloses an airborne infrared MWIR prime lens which consists of six optical elements. The lens is compact with a length of only 116.5 mm. However, this lens is not suitable for scanning airborne systems.

Application WO2018236344A1 is for a wide-angle MWIR F-theta lens with an F# of 2. The lens is deployed on airborne platforms for remote sensing applications. The lens is corrected for monochromatic and chromatic aberrations over the wavelength range of 3.3 micrometers to 5.1 micrometers. The image of the remote target is formed on a focal plane which may constitute CCD or CMOS with micro lenses. Very different from the current disclosure, the lens comprises four groups of optical elements with a cold shield/aperture stop located behind the last group. Also different from the current disclosure, embodiments of the lens include five types of optical materials, while another embodiment of the lens includes only two types of optical materials.

U.S. Pat. No. 8,101,918B1 describes a re-imaging MWIR optical system includes a front objective lens group, a relay lens, and a Dewar assembly. The front objective lens group includes at least three lenses for focusing light entering an entrance pupil and forming a first image located adjacent or near a field stop, different from the current disclosure. The relay lens group includes at least three lenses for focusing light from the first image toward the Dewar assembly. Lenses of the front objective lens group and the lenses of the relay lens group are made from readily available material, such as silicon and/or germanium. The lens operates with an F# of 4.

Patent application US20120162750A1 describes a continuous zoom lens arrangement that can image MWIR and LWIR spectral bands to a common image plane. The lens has an F# of 3. However, it provides low resolution utilizing a 640×480 element focal plane array with 20 micron square pixels.

Application US2013/0076900A1 is for a Wide Field of View Monocentric Lens System for Infrared Aerial Reconnaissance Camera Systems, and consists of shell-type elements and may be used for LWIR, MWIR or SWIR applications. Image is focused on a curved focal surface, different from the current disclosure.

Therefore, there exists a need in the art for a high performance MidWave InfraRed (MWIR) lens for sensing, and more particularly, to an infrared lens objective used in an airborne remote sensing system, producing an image with a spectral wavelength range of about 3.3 micrometers to 5.1 micrometers.

SUMMARY

An embodiment provides a MidWave InfraRed (MWIR) lens device for remote sensing comprising, in order, from a remote object to an image plane a first optical group having a positive optical power; a first fold mirror; a second fold mirror; a second optical group having a positive optical power; an Aperture Stop (AS); a Focal Plane Array (FPA); wherein the lens is corrected over a spectral waveband of 3.3 μm to 5.1 μm, distortion is 1% at an edge of said FPA, an angular field of view is 10.94 degrees, FPA edge-to-edge, an effective focal length is 20 inches, and an F# is 3.33; whereby an image is formed. Embodiments further comprise a fast scanning mirror before the first optical group. Other embodiments further comprise a Dewar window between the second optical group and the aperture stop. Subsequent embodiments further comprise a cold filter between the aperture stop and the focal plane array. For additional embodiments, the first optical group is configured to receive MWIR radiation from the remote object and to direct the converged light onto the second optical group; the first optical group consists of three optical elements having, in order from the object to the image plane, positive, negative, and positive optical powers correspondingly; the first fold mirror is configured to bend the optical axis between the first optical group and the second fold mirror; the second fold mirror is configured to bend the optical axis between the first fold mirror and the second optical group; the second optical group is configured to re-image the light from the intermediate image formed by the first optical group between first and second fold mirrors and to focus the light through a Dewar window, aperture stop, and a cold filter onto the focal plane array, in corresponding order; the second optical group consists of four optical elements having, in order from the object to the image plane, positive, positive, negative, and positive optical powers correspondingly. In another embodiment, the first optical element of the first optical group is made in a form of a positive meniscus whose convex surface faces toward the object; and a first surface of a first optical element of the first optical group is formed aspherical. For a following embodiment a second optical element of the first optical group is made in a form of a negative meniscus lens whose concave surface faces toward the image; and a first surface of the second optical element of the first optical group is formed aspherical. In subsequent embodiments a third optical element of the first optical group is made in a form of a positive bi-convex. In additional embodiments a first optical element of the second optical group is made in a form of a bi-convex; and a first surface of the first element of the second optical group is formed aspherical. In included embodiments a second optical element the second optical group is made in a form of a positive meniscus whose concave surface faces toward the image. In yet further embodiments a third optical element of the second optical group is made in a form of a negative meniscus whose concave surface faces toward the image. In related embodiments a fourth optical element of the second optical group is made in a form of a positive meniscus whose concave surface faces toward the object; and a second surface of the fourth optical element of the second optical group is formed aspherical. For further embodiments a material of the optical element of the first optical group is silicon; a first optical element of the second optical group material is silicon; and a second optical element of the second optical group material is silicon. In ensuing embodiments a material of a second optical element of the first optical group is germanium; a third element of the first optical group material is germanium; a third optical element of the second optical group material is germanium; and a fourth optical element of the second optical group material is germanium. For yet further embodiments, the following parameters apply: $-1.35 < F_L/F_{G1} < -1.15$; $-4.60 < F_L/F_{G2} < -3.40$; $2.70 < F_{G1}/F_{G2} < 3.70$; $2.50 < F_{G1}/F_1 < 3.50$; $-5.00 < F_{G1}/F_2 < -4.00$; $1.35 < F_{G1}/F_3 < 1.85$; $0.69 < F_{G2}/F_4 < 0.93$; $0.85 < F_{G2}/F_5 < 1.15$; $-2.15 < F_{G2}/F_6 < -1.59$; $0.51 < F_{G2}/F_7 < 0.69$; $-0.55 < F_L/OAL < -0.45$; $6.65 < OAL/CSD < 6.95$; $2.45 < V_1/V_2 < 2.65$; $2.45 < V_1/V_3 < 2.65$; $0.95 < V_4/V_5 < 1.15$; $2.45 < V_4/V_6 < 2.65$; $2.45 < V_4/V_7 < 2.65$; $0.44 < TP_1/TP_2 < 0.48$; $0.44 < TP_1/TP_3 < 0.48$; $0.95 < TP_4/TP_5 < 1.15$; $0.44 < TP_4/TP_6 < 0.48$; and $0.44 < TP_4/TP_7 < 0.48$ wherein: $F_L$ is a focal length of the lens; $F_{G1}$, and $F_{G2}$ are the focal lengths of the first and second optical groups correspondingly; $F_1, F_2, F_3, F_4, F_5, F_6$, and $F_7$ are the focal lengths of optical elements 1, 2, 3, 4, 5, 6, and 7 correspondingly; OAL is an overall length of the lens; CSD is a cold shield distance from the aperture stop to the focal plane array; $V_1, V_2, V_3, V_4, V_5, V_6$, and $V_7$ are Abbe numbers of the optical elements 1, 2, 3, 4, 5, 6, and 7 correspondingly; and $TP_1, TP_2, TP_3, TP_4, TP_5, TP_6$, and $TP_7$ are the thermal powers of the optical elements 1, 2, 3, 4, 5, 6, and 7 correspondingly.

Another embodiment provides a MidWave InfraRed (MWIR) Wide Area Motion Imagery (WAMI) system comprising, in order, from an object to an image plane a fast scanning mirror; a first optical group having a positive optical power; a first fold mirror; a second optical group having a positive optical power; a Dewar window; an Aperture Stop (AS); a cold filter; and a Focal Plane Array (FPA); wherein the lens is corrected over the spectral waveband 3.3 μm-5.1 μm to form an MWIR image. For more embodiments, the first optical group is configured to receive (MWIR radiation from a remote object and to direct converged light onto the second optical group; the first optical group consists of three optical elements having, in order from the object to the image plane, positive, negative and positive optical powers correspondingly; and the first fold mirror is configured to bend the optical axis between the first optical group and the second fold mirror. Continued embodiments include the second fold mirror is configured to bend an optical axis between the first fold mirror and the second optical group; the second optical group is configured to re-image light from an intermediate image formed by the first optical group between first and second fold mirrors, and to focus the light through the Dewar window, aperture stop, and cold filter onto the focal plane array in corresponding order; the second optical group consists of four optical elements having, in order from the object to the image plane, positive, positive, negative and positive optical powers correspondingly. For additional embodiments, a focus shift is between −0.03 and +0.05 inches between −35 C and +35 C and 0 to 60,000 feet altitude.

A yet further embodiment provides an airborne Mid-Wave Infrared (MWIR) Wide Area Motion Imagery (WAMI) remote sensor comprising, in order, from an object to an image plane a fast scanning mirror; a first optical group having a positive optical power; a first fold mirror; a second optical group having a positive optical power; a Dewar window; an Aperture Stop (AS); a cold filter; and a Focal Plane Array (FPA); wherein the first optical group is configured to receive (MWIR radiation from a remote object and to direct converged light onto the second optical group; the first optical group consists of three optical elements having, in order from the object to the image plane, positive, negative and positive optical powers correspondingly; the first fold mirror is configured to bend the optical axis between the first optical group and the second fold mirror; the second fold mirror is configured to bend an optical axis between the first fold mirror and the second optical group; the second optical group is configured to re-image light from an intermediate image formed by the first optical group between first and second fold mirrors, and to focus the light through the Dewar window, aperture stop, and cold filter onto the focal plane array in corresponding order; the second optical group consists of four optical elements having, in order from the object to the image plane, positive, positive, negative and positive optical powers correspondingly; wherein only two optical materials are used; and wherein the lens is corrected over the spectral waveband 3.3 μm-5.1 μm to form an MWIR image.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIGS. 14A-14E present the lens prescription configured in accordance with an embodiment.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

According to embodiments, a Mid-Wave Infrared (MWIR) objective and relay lens system with an F# of 3.33 and angular field of view of 15.28°. The lens system is deployed, in conjunction with a focal plane and scanning system, on an airborne platform for wide area motion imagery applications. The lens system is corrected for monochromatic and chromatic aberrations over the MWIR wavelength range of 3.3 micrometers to 5.1 micrometers. The effective focal length is 20 inches. Image of the remote target is formed on a focal plane array. The overall length of the lens system is 40.70 inches. In embodiments, the lens system comprises, in order from the object to the image, two groups of optical elements with a cold shield/aperture stop located at a distance of 6 inches from the image plane. Also, in an embodiment the first optical group acting as an objective lens has a positive optical power and includes three optical elements, the second optical group acting as a relay lens has a positive optical power and includes four optical elements. The lens system is comprised of only two optical materials, Germanium and Silicon. The powers of the optical groups and elements, their shapes, refractive indices and dispersions of materials are selected such that the lens system is both apochromatic and orthoscopic. The lens system is used in a scanning system in a pre-objective configuration where the fast scan mirror is located in front of the lens system.

Figure 7:
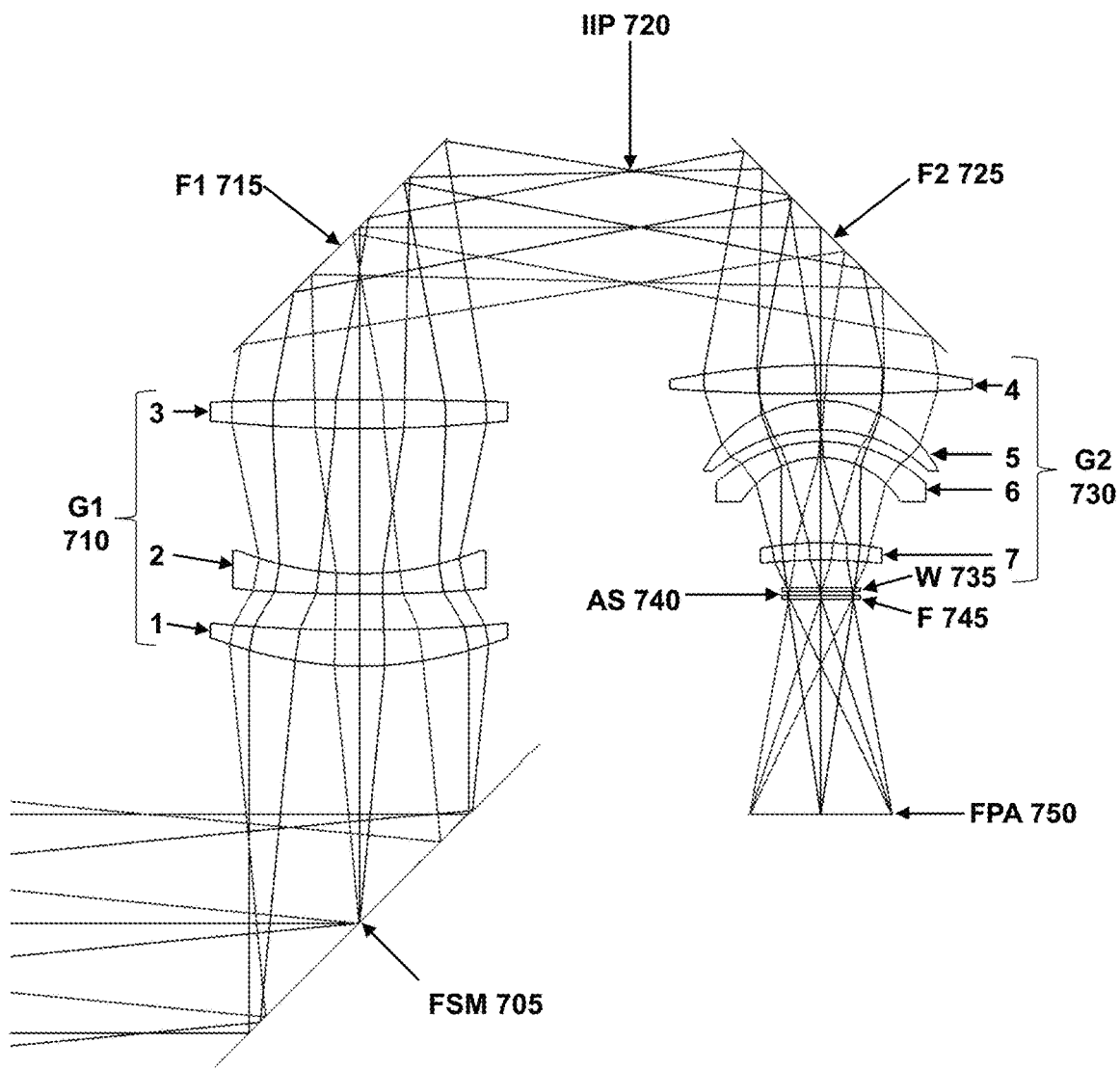
FIG. 7 shows a lens configured in accordance with an embodiment.

FIG. 7 shows an embodiment MWIR lens system 700 for Wide Area Motion Imagery (WAMI). The signal from the scene or image is represented by the series of bundled lines entering from the left and striking the Fast Scanning Mirror (FSM). In embodiments, the lens system includes Fast Scanning Mirror (FSM) 705; first optical Group G1 710; first fold mirror F1 715; Intermediate Image Plane (IIP) 720; second fold mirror F2 725, second optical Group G2 730; Dewar Window W 735; Aperture Stop (cold shield) AS 740; cold Filter F 745; and Focal Plane Array (FPA) 750. The image of the remote target is formed on FPA 750 which constitutes a CCD.

TABLE 3

Specification for lens system embodiments is as follows:

| PARAMETER TYPE | PARAMETER VALUE |
|---|---|
| Effective Focal Length | 20 in. (508 mm) +/− 3.0% |
| Relative Aperture | F/3.3 |
| Spectral Band | 3 to 5.1 microns |
| Full Field of View | 10.94 degrees (FPA edge-to-edge) |
| As-Built Optical MTF (1/2-Nyquist) | 25% @ 31.25 lp/mm @ FPA edge |
| Distortion | 1% @ FPA edge |
| Pixel Pitch | 8 microns |
| FPA Format | 12288 × 12288 pixels (3.87" × 3.87") |
| Operational Temp. and Alt. Range | −35 C. to 35 C./0 kft to 60 kft |
| F/# | 3.33 |
| IFOV | 15 μrad |
| Fold Mirrors | 2 |
| # of Elements | 7 |
| Element Materials | Ge & Si |

In embodiments the fast scan mirror FSM rotates around two axes with certain steps in order to cover the whole target while obtaining the necessary ground samples.

In embodiments the first optical group G1 710 has a positive overall optical power and is configured to receive the light (MWIR radiation) from the remote object and to direct converged light onto the intermediate image plane IIP 720. Group G1 710 consists of first optical element 1, second optical element 2, and third optical element 3.

In embodiments the first optical element 1 of group G1 710 has a positive optical power and is made in a form of a positive meniscus whose convex surface faces toward the object. The first surface of the first optical element 1 is formed aspherical. Element 1 material is silicon.

In embodiments the second optical element 2 of group G1 710 has a negative optical power and is made in a form of a negative meniscus lens whose concave surface faces toward the image. The first surface of the second optical element 2 is formed aspherical. Element 2 material is germanium.

In embodiments the third optical element 3 of group G1 710 has a positive optical power and is made in a form of a bi-convex lens. Element 3 material is germanium.

In embodiments the fold mirror F1 715 is directing the flux from the first optical group G1 710 to fold mirror F2 725 in order to make the lens more compact and has been placed such that the intermediate image plane IIP 720 forms between F1 715 and F2 725.

In embodiments the fold mirror F2 725 is directing the flux from the fold mirror F1 715 to the second optical group G2 730 in order to further bend the optical path to make the lens more compact.

In embodiments the second optical group G2 730 has an overall positive optical power and is configured to re-image the light from the intermediate image plane IIP 720 through the Dewar window W 735 and cold filter F 745 onto the focal plane arrays FPA 750. The group G2 730 consists of first optical element 4, second optical element 5, third optical element 6 and fourth optical element 7.

In embodiments the second optical group G2 730 conjugates intermediate image plane IIP 720 with the FPA 750 in order to have a reasonable cold shield distance (from the cold shield aperture to the FPA 750) and 100% cold shield efficiency.

In embodiments the first optical element 4 of group G2 730 has a positive optical power and is made in a form of a bi-convex lens. The first surface of the first optical element 4 is formed aspherical. Element 4 material is silicon.

In embodiments the second optical element 5 of group G2 730 has a positive optical power and is made in a form of a positive meniscus whose concave surface faces toward the image. The material of element 5 is silicon.

In embodiments the third optical element 6 of group G2 730 has a negative optical power and is made in a form of a negative meniscus whose concave surface faces toward the image. The material of the element 6 is germanium.

In embodiments the fourth optical element 7 of group G2 730 has a positive optical power and is made in a form of a positive meniscus whose concave surface faces toward the image. The second surface of the fourth element 7 is formed aspherical. The material of the element 7 is germanium.

In embodiments the aperture stop AS 740, which determines the cold shield opening, is positioned between the Dewar window W 735 and FPA 750.

In embodiments the following relations among the optical groups G1 710, G2 730, and their constituent optical elements have been found to achieve monochromatic and chromatic aberrational correction across the field along with 100% cold shield efficiency.

$$-1.35 < F_L/F_{G1} < -1.15$$

$$-4.60 < F_L/F_{G2} < -3.40$$

$$2.70 < F_{G1}/F_{G2} < 3.70$$

$$2.50 < F_{G1}/F_1 < 3.50$$

$$-5.00 < F_{G1}/F_2 < -4.00$$

$$1.35 < F_{G1}/F_3 < 1.85$$

$$0.69 < F_{G2}/F_4 < 0.93$$

$$0.85 < F_{G2}/F_5 < 1.15$$

$$-2.15 < F_{G2}/F_6 < -1.59$$

$$0.51 < F_{G2}/F_7 < 0.69$$

$$-0.55 < F_L/OAL < -0.45$$

$$6.65 < OAL/CSD < 6.95$$

$$2.45 < V_1/V_2 < 2.65$$

$$2.45 < V_1/V_3 < 2.65$$

$$0.95 < V_4/V_5 < 1.15$$

$$2.45 < V_4/V_6 < 2.65$$

$$2.45 < V_4/V_7 < 2.65$$

$$0.44 < TP_1/TP_2 < 0.48$$

$$0.44 < TP_1/TP_3 < 0.48$$

$$0.95 < TP_4/TP_5 < 1.15$$

$$0.44 < TP_4/TP_6 < 0.48$$

$$0.44 < TP_4/TP_7 < 0.48$$

Wherein:
$F_L$ is the focal length of the lens according to an embodiment;
$F_{G1}$, and $F_{G2}$—are the focal lengths of the first and second optical groups correspondingly;
$F_1$, $F_2$, $F_3$, $F_4$, $F_5$, $F_6$, and $F_7$—are the focal lengths of the optical elements 1, 2, 3, 4, 5, 6, and 7 correspondingly;
OAL is the overall length of the lens;
CSD is the cold shield distance from the aperture stop to the focal plane array FPA;
$V_1$, $V_2$, $V_3$, $V_4$, $V_5$, $V_6$, and $V_7$ are the Abbe numbers of the optical elements 1, 2, 3, 4, 5, 6, and 7 correspondingly;
$TP_1$, $TP_2$, $TP_3$, $TP_4$, $TP_5$, $TP_6$, and $TP_7$ are the thermal powers of the optical elements 1, 2, 3, 4, 5, 6, and 7 correspondingly.

Described above relations between the focal lengths of the optical groups $G_1$ and $G_2$ provide a lens system with a long focal length of 20 inches along with a 100% efficient cold shield along with desired cold shield distance of 6.00 inches. These relations provide Petzval curvature correction as well.

Mutual combination of optical elements materials' dispersions allows axial chromatic aberration correction along with a lateral color correction.

Mutual combination of optical elements configuration and specific usage of aspherical surfaces allows achieving low F# of 3.33 while having large field of view of 15.28°, and an IFOV of 15 microradians.

On-axis spherical aberration and off-axis aberrations such as coma, astigmatism and high order field curvature are corrected. The lens is orthoscopic—it has a very low distortion of less than 1% at the edge of the FPA.

For embodiments, mutual combinations of optical elements, thermal powers, and Titanium barrels and Aluminum metering structure provide an acceptable defocus over the temperature range of −35° C. to +35° C. Thermally induced defocus as well as altitude change from Sea level to 60,000 feet are compensated by the axial motion of the first optical group G1 710. Total range of the motion of the first group G1 710 is 0.075 inches.

Figure 1:
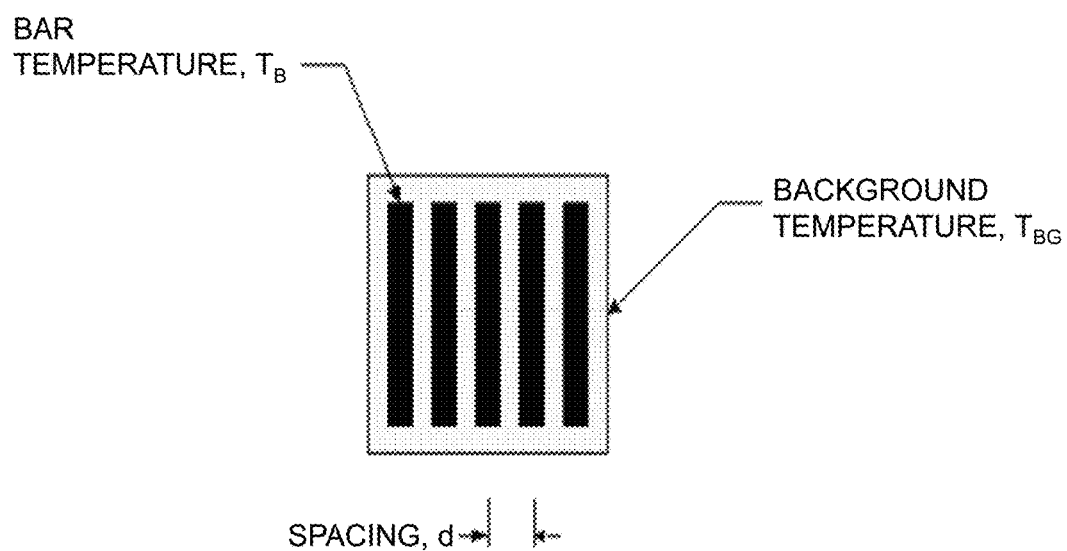
FIG. 1 (Prior Art) depicts an MRTD target test pattern.
Figure 2:
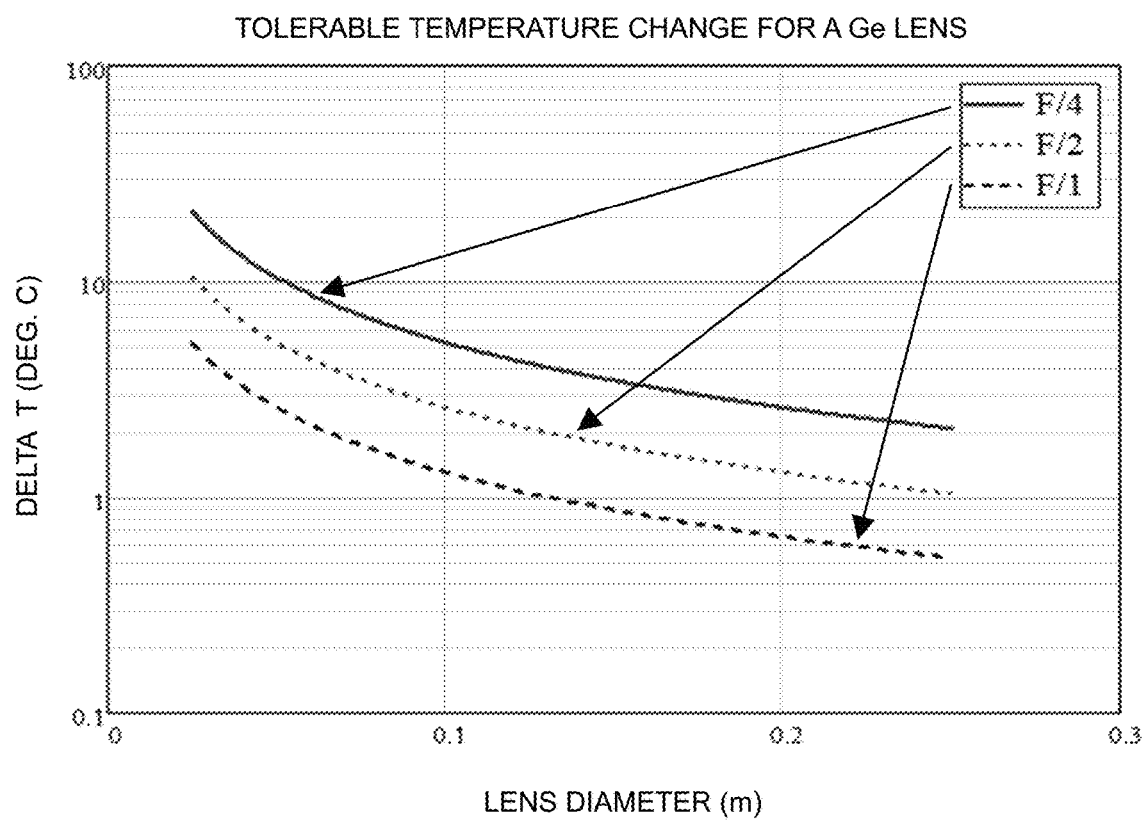
FIG. 2 (Prior Art) is a graph of tolerable temperature change for a Ge lens.
Figure 3:
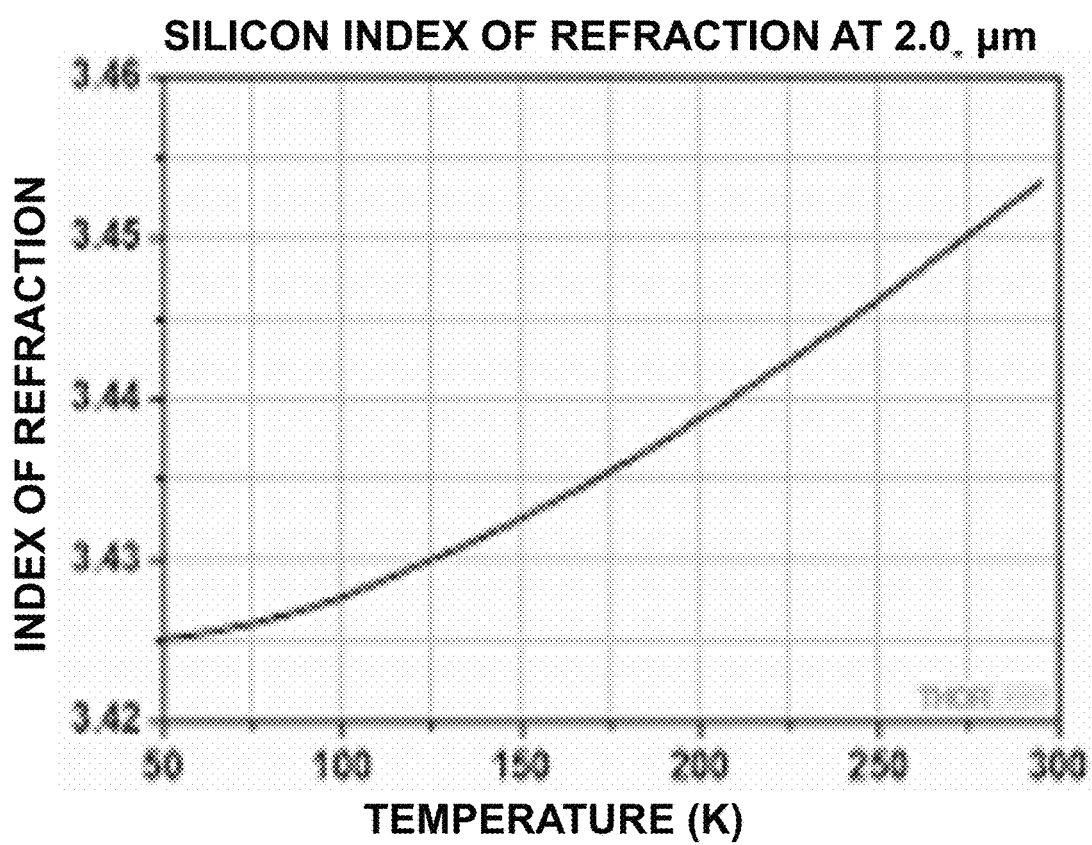
FIG. 3 (Prior Art) is a graph depicting Silicon refractive index change with temperature.
Figure 4:
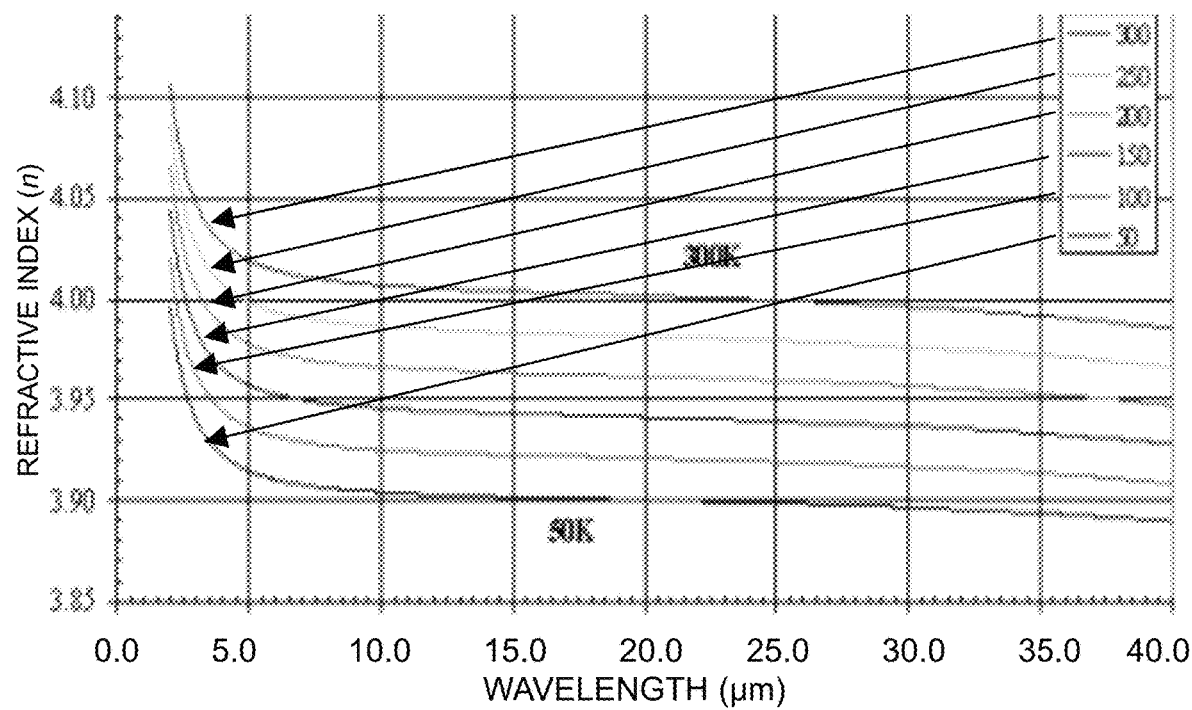
FIG. 4 (Prior Art) is a graph depicting Germanium refractive index change through temperature and spectrum.
Figure 5:
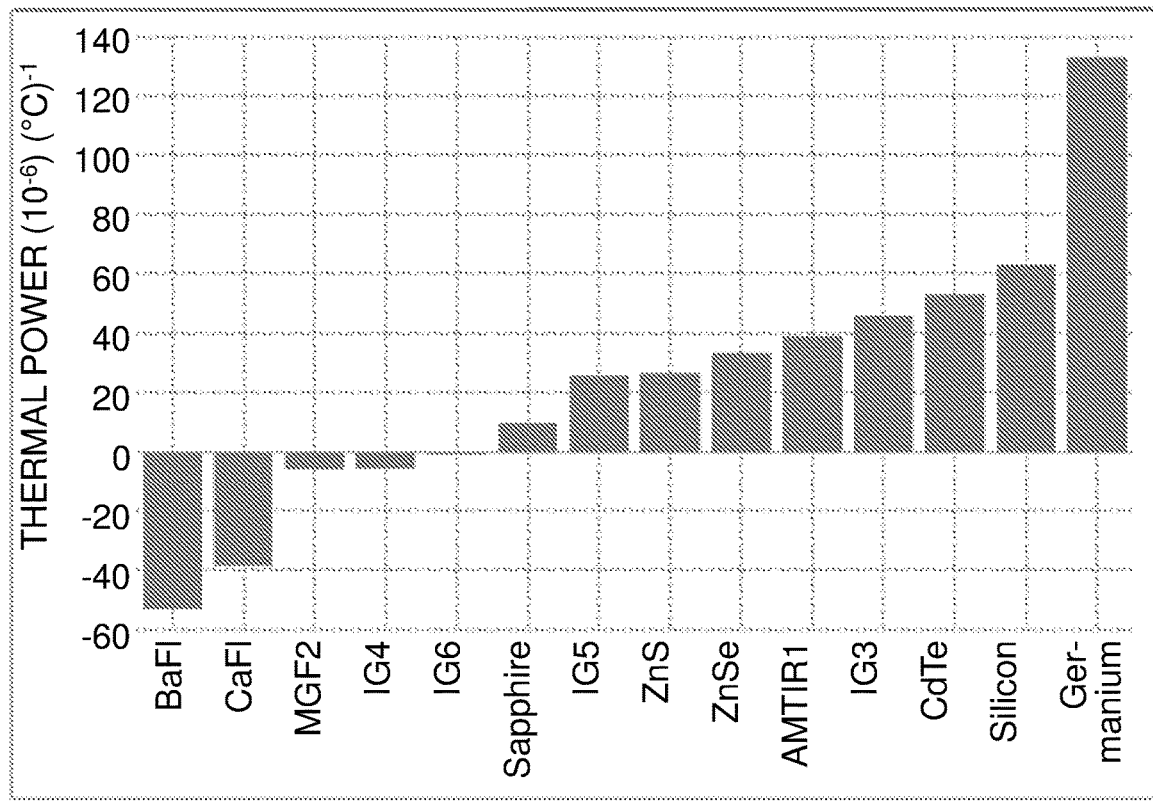
FIG. 5 (Prior Art) is a chart of thermal powers of IR lens materials.
Figure 6:
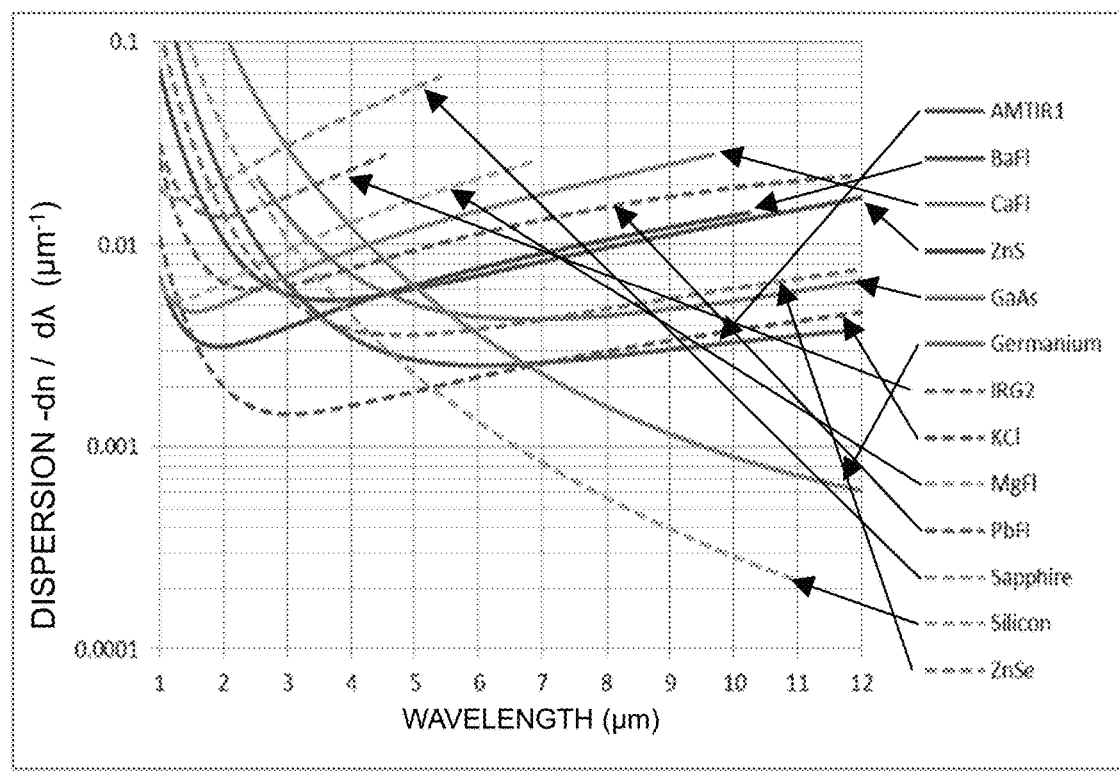
FIG. 6 (Prior Art) is a graph of Infrared materials dispersion.
Figure 8:
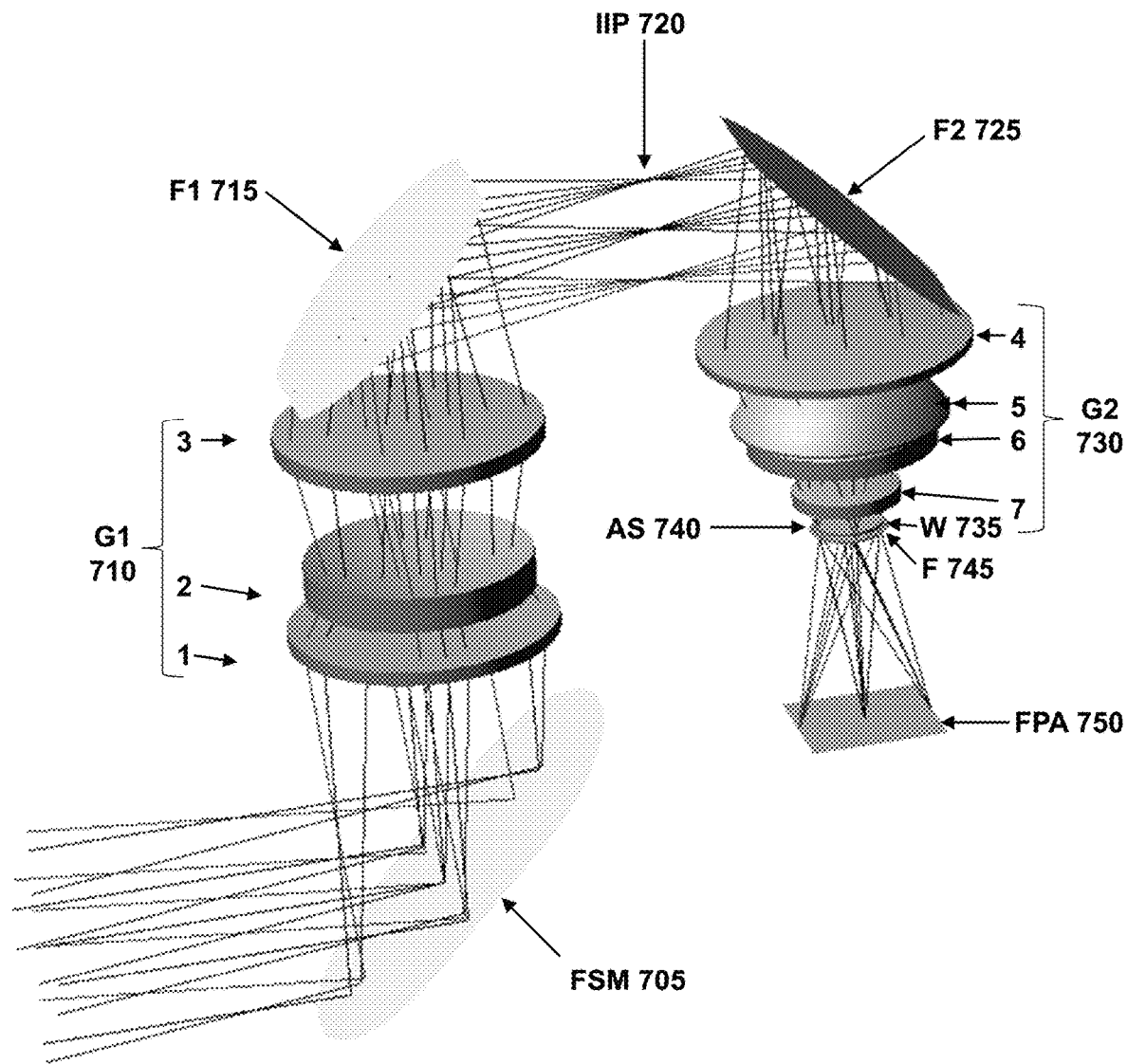
FIG. 8 shows a 3D lens configuration in accordance with an embodiment.

FIG. 8 is a 3D configuration of the MWIR lens for remote sensing presented in FIG. 6. The lens consists of fast scanning mirror FSM 705, optical groups $G_1$ 710 and $G_2$ 730. First fold mirror F1 715 and second fold mirror F2 725 are located between the first optical group and the second optical group. First optical group G₁ 710 includes three optical elements 1, 2 and 3. Second optical group G₂ 730 includes four optical elements 4, 5, 6 and 7. Dewar window W 735 is positioned before the aperture stop AS 740. Cold filter F 745 is positioned after the aperture stop AS 740 and before the focal plane array FPA 750.

Figure 9:
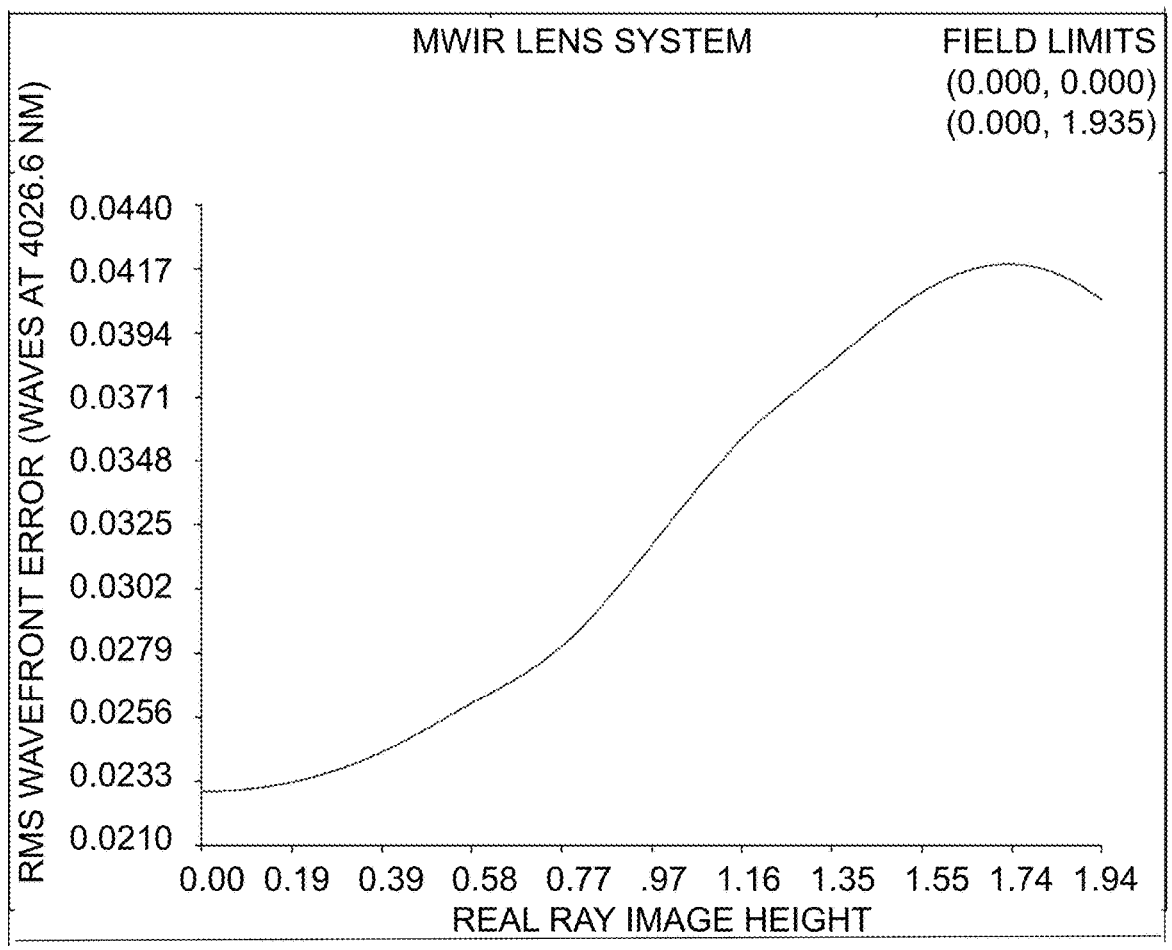
FIG. 9 shows wavefront RMS data configured in accordance with an embodiment.

FIG. 9 is a wavefront RMS graph for embodiments of the lens system. According to Marechal diffraction-limited criterion: minimum Strehl number shall not exceed 0.80~ (maximum wavefront error 1/13.4=0.07 wave RMS). Performance is diffraction limited across the field.

Figure 10:
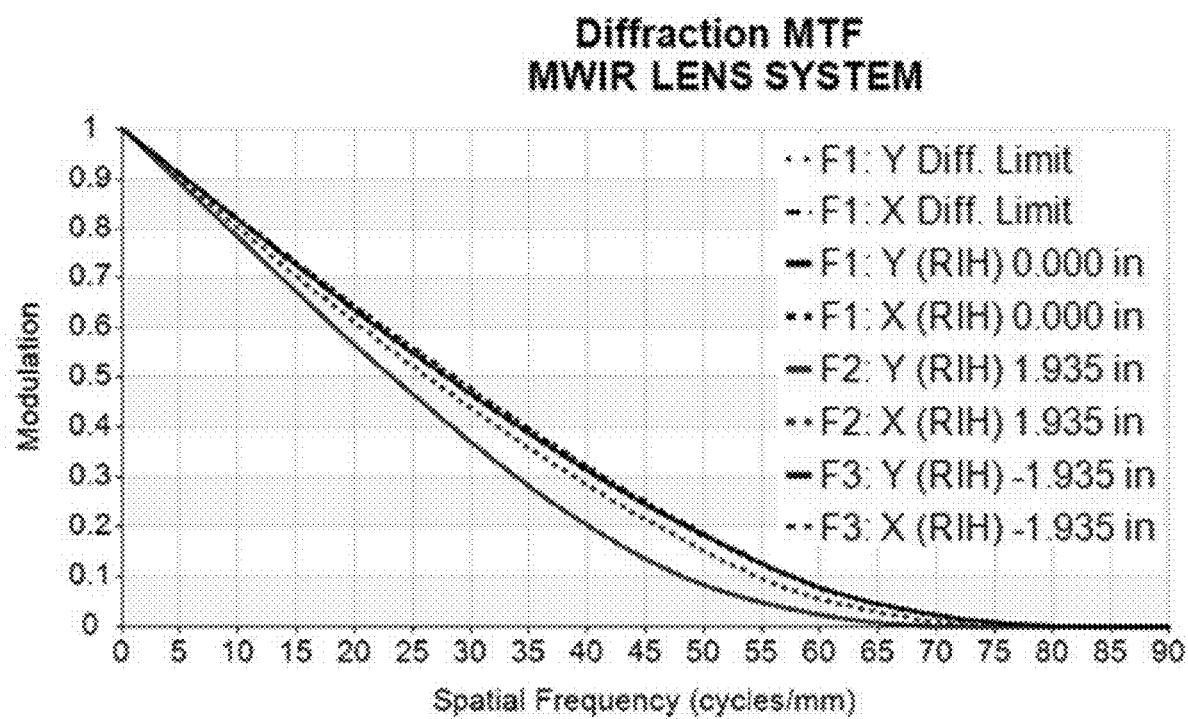
FIG. 10 shows MTF data configured in accordance with an embodiment.

FIG. 10 presents polychromatic MTF curves across the field for an embodiment of the lens. The lens is well corrected across the MWIR spectrum of 5.1 μm-3.3 μm.

Figure 11:
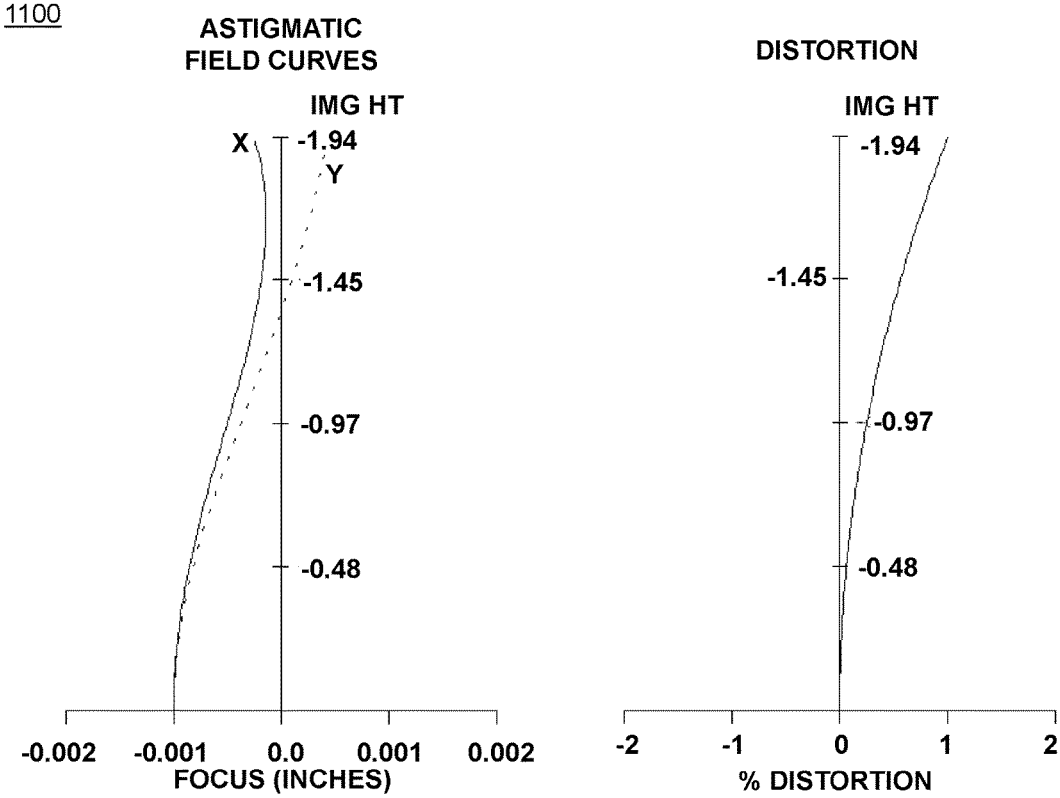
FIG. 11 shows astigmatism and distortion data configured in accordance with an embodiment.

FIG. 11 depicts astigmatic field curves and a distortion graph and table of an embodiment of the lens. Astigmatism is low, and is corrected across the field. Distortion is 1% at the edge of the FPA.

Figure 12:
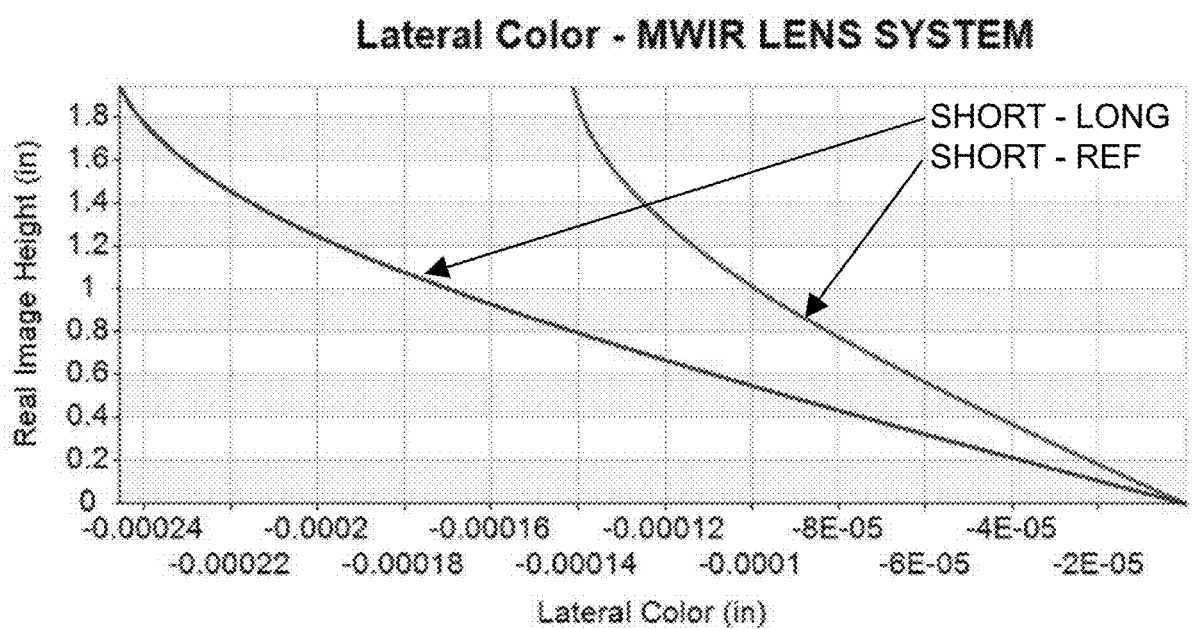
FIG. 12 shows lateral color data configured in accordance with an embodiment.

FIG. 12 is a lateral color plot of an embodiment of the lens. Lateral color is corrected across the field, and maximum lateral color is 0.00011 inches at FPA edges.

Figure 13:
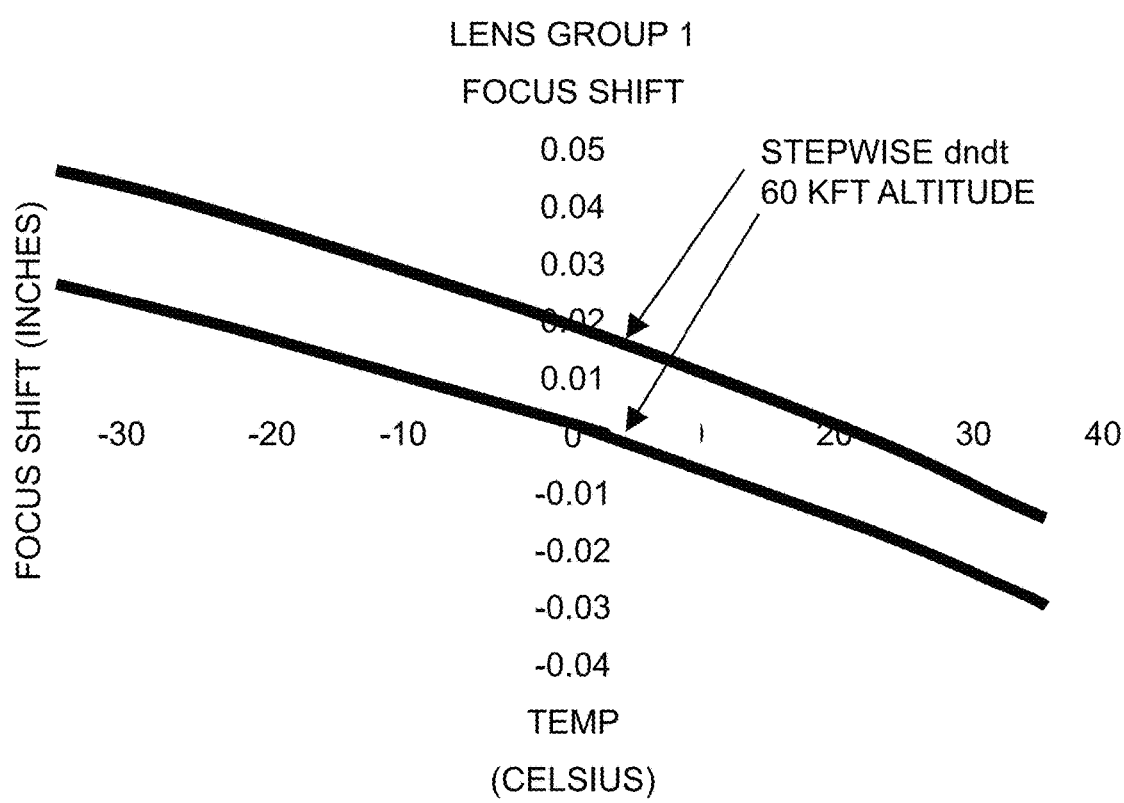
FIG. 13 shows the thermal compensation configured in accordance with an embodiment.

FIG. 13 depicts thermal properties of an embodiment of the lens. Thermal defocus through the temperature range of −35° C. to +35° C. and altitude change from sea level to 60000 feet are compensated by the first group G1 710 motion. Total range of Group 1 710 motion is 0.075 inches.

FIGS. 14A-14E provide the prescription of an embodiment of the lens.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A MidWave InfraRed (MWIR) lens device for remote sensing comprising;
    a first optical group configured to converge MWIR radiation from a remote object, wherein first optical group comprises a first optical element having a positive optical power, a second optical element having a negative optical power and a third optical element having a positive optical power;
    a first fold mirror configured to receive a converged MWIR radiation from the first optical group;
    a second fold mirror configured to receive the converged MWIR radiation from the first fold mirror;
    a second optical group configured to receive the converged MWIR radiation from the second fold mirror and focus the converged MWIR radiation, wherein the second optical group comprises a fourth optical element having a positive optical power, a fifth optical element having a positive optical power, a sixth optical element having a negative optical power, and a seventh optical element having a positive optical power;
    an aperture stop configured to receive the focused MWIR radiation from the second optical group;
    a Focal Plane Array (FPA) configured to receive an output from the aperture stop;
    wherein the MidWave InfraRed (MWIR) lens device has a spectral waveband of 3.3 μm to 5.1 μm, with a distortion of 1% at an edge of said FPA, an angular field of view of 10.94 degrees, FPA edge-to-edge, an effective focal length of 20 inches, and an F # of 3.33;
    whereby an image is formed on the FPA.

2. The MWIR lens device for remote sensing of claim 1 further comprising:
    a fast scanning mirror before the first optical group, wherein the fast scanning mirror rotates around two axes to scan the remote object.

3. The MWIR lens device for remote sensing of claim 1 further comprising:
    a Dewar window between the second optical group and the aperture stop.

4. The MWIR lens device for remote sensing of claim 1 further comprising:
    a cold filter between the aperture stop and the focal plane array.

5. The MWIR lens device for remote sensing of claim 1 wherein:
    the first fold mirror and the second fold mirror are configured to bend an optical axis of the converged MWIR radiation.

6. The MWIR lens device for remote sensing of claim 1 wherein the first optical element is a positive meniscus whose convex surface faces toward the object; and
    a first surface of a first optical element is aspherical.

7. The MWIR lens device for remote sensing of claim 1 wherein the second optical element is a negative meniscus lens whose concave surface faces toward the image; and a first surface of the second optical element is aspherical.

8. The MWIR lens device for remote sensing of claim 1 wherein the third optical element is a positive bi-convex.

9. The MWIR lens device for remote sensing of claim 1 wherein the fourth optical element is a bi-convex; and
    a first surface of the fourth optical element is aspherical.

10. The MWIR lens device for remote sensing of claim 1 wherein the fifth optical element is a positive meniscus whose concave surface faces toward the image.

11. The MWIR lens device for remote sensing of claim 1 wherein the sixth optical element is a negative meniscus whose concave surface faces toward the image.

12. The MWIR lens device for remote sensing of claim 1 wherein the seventh optical element is a positive meniscus whose concave surface faces toward the object; and
    a second surface of the seventh optical element is aspherical.

13. The MWIR lens device for remote sensing of claim 1 wherein
    the first, fourth and fifth optical element is silicon.

14. The MWIR lens device for remote sensing of claim 1 wherein the second, third, sixth and seventh optical element is germanium.

15. The MWIR lens device for remote sensing of claim 1 wherein:

$-1.35<FL/FG1<-1.15;$ $-4.60<FL/FG2<-3.40;$ $2.70<FG1/FG2<3.70;$ $2.50<FG1/F1<3.50;$ $-5.00<FG1/F2<-4.00;$ $1.35<FG1/F3<1.85;$ $0.69<FG2/F4<0.93;$ $0.85<FG2/F5<1.15;$ $-2.15<FG2/F6<-1.59;$ $0.51<FG2/F7<0.69;$ $-0.55<FL/OAL<-0.45;$ $6.65<OAL/CSD<6.95;$ $2.45<V1/V2<2.65;$ $2.45<V1/V3<2.65;$ $0.95<V4/V5<1.15;$ $2.45<V4/V6<2.65;$ $2.45<V4/V7<2.65;$ $0.44<TP1/TP2<0.48;$ $0.44<TP1/TP3<0.48;$ $0.95<TP4/TP5<1.15;$ $0.44<TP4/TP6<0.48;$ and $0.44<TP4/TP7<0.48$ wherein:
FL is a focal length of the lens device;
FG1, and FG2 are the focal lengths of the first and second optical groups correspondingly;
F1, F2, F3, F4, F5, F6, and F7 are focal lengths of the first, second, third, fourth, fifth, sixth and seventh optical elements correspondingly;
OAL is an overall length of the lens device;
CSD is a cold shield distance from the aperture stop to the focal plane array;
V1, V2, V3, V4, V5, V6, and V7 are Abbe numbers of the first, second, third, fourth, fifth, sixth and seventh optical elements correspondingly; and
TP1, TP2, TP3, TP4, TP5, TP6, and TP7 are the thermal powers of the first, second, third, fourth, fifth, sixth and seventh optical elements correspondingly.

16. A MidWave InfraRed (MWIR) Wide Area Motion Imagery (WAMI) system comprising, in order, from an object to an image plane:
a fast scanning mirror providing scanning about two axes to scan the object;
a first optical group having a positive optical power configured to receive MWIR radiation from the object and provide a converged MWIR radiation, wherein first optical group comprises a first optical element having a positive optical power, a second optical element having a negative optical power and a third optical element having a positive optical power;
a first fold mirror and a second fold mirror configured to bend an optical axis of the converged MWIR radiation;
a second optical group having a positive optical power and configured to receive the converged MWIR radiation from the first fold mirror and focus the converged MWIR radiation, wherein the second optical group comprises a fourth optical element having a positive optical power, a fifth optical element having a positive optical power, a sixth optical element having a negative optical power, and a seventh optical element having a positive optical power;
A Dewar window;
An aperture stop;
a cold filter; and
a Focal Plane Array (FPA), wherein the focused converged MWIR radiation travels through the Dewar window, aperture stop, cold filter and forms an image on the FPA;
wherein the MidWave InfraRed (MWIR) system has a spectral waveband of 3.3 µm-5.1 µm.

17. The system of claim 16, wherein
a focus shift compensation by an axial motion of the first optical group is between −0.03 and +0.05 inches to correct for temperature changes between −35 C and +35 C and altitude changes from 0 to 60,000 feet altitude.

18. An airborne Mid-Wave Infrared (MWIR) Wide Area Motion Imagery (WAMI) remote sensor comprising, in order, from an object to an image plane:
a fast scanning mirror providing scanning about two axes to scan the object;
a first optical group having a positive optical power;
a first fold mirror;
a second fold mirror;
a second optical group having a positive optical power;
a Dewar window;
an aperture stop;
a cold filter; and
a Focal Plane Array;
wherein the first optical group is configured to receive MWIR radiation from the object and to direct a converged light onto the second optical group;
the first optical group comprising three optical elements having, in order from the object to the image plane, positive, negative and positive optical powers correspondingly;
the first fold mirror located between the first optical group and the second fold mirror;
the second fold mirror located between the first fold mirror and the second optical group, wherein the first and second fold mirror are configured to bend an optical axis of the converged light;
the second optical group is configured to re-image the converged light from the first optical group, and to focus the re-imaged light through the Dewar window, the aperture stop, and the cold filter onto the focal plane array in corresponding order;
the second optical group consists of four optical elements having, in order from the object to the image plane, positive, positive, negative and positive optical powers correspondingly;

wherein the optical elements of first and second optical groups consist of two optical materials; and wherein the sensor operates in a spectral waveband of 3.31 μm-5.1 μm and forms an MWIR image on the focal plane array.

19. The airborne Mid-Wave Infrared (MWIR) Wide Area Motion Imagery (WAMI) remote sensor according to claim 18, wherein the two optical materials are silicon and germanium.

* * * * *